J. F. Hammond.
Straw-Cutter.

N° 73,180.  Patented Jan. 7, 1868.

Witnesses.  Inventor.
O. C. Houghton  J. F. Hammond.
A. T. Gibbs

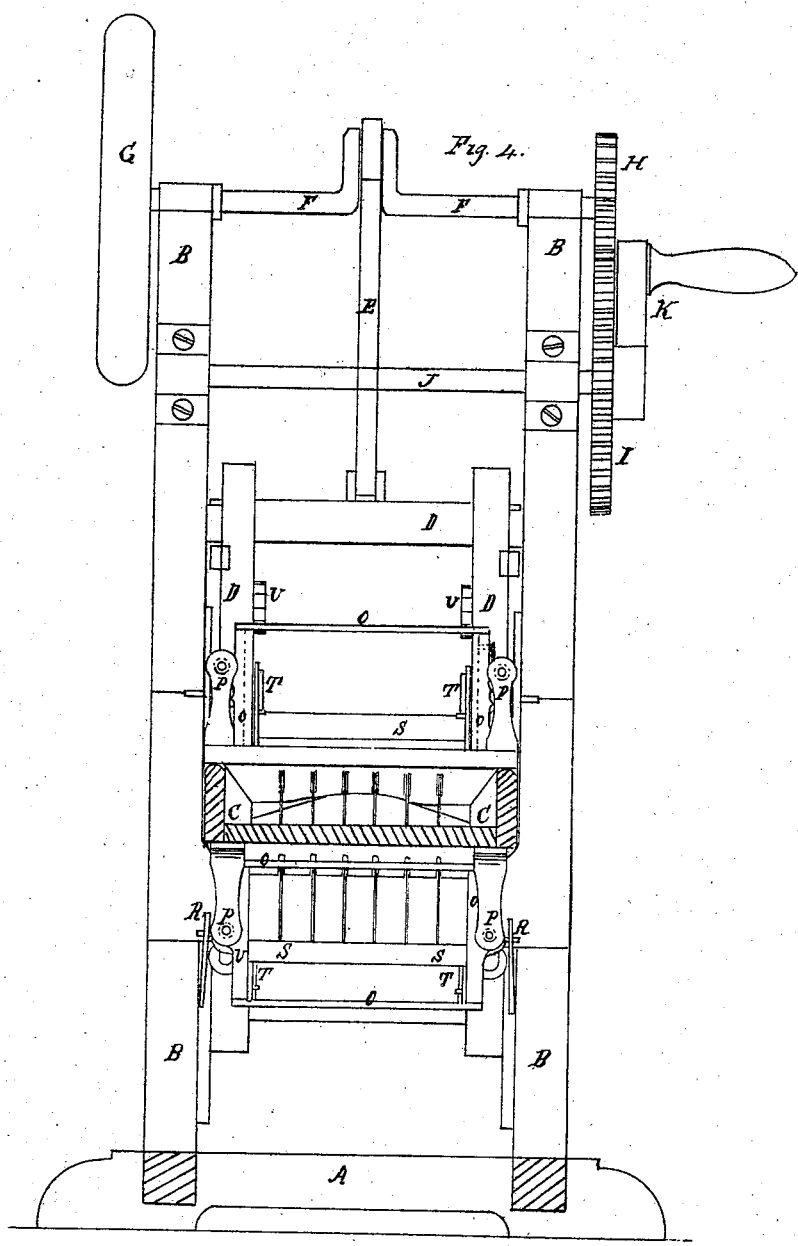

United States Patent Office.

J. F. HAMMOND, OF NORTH SUDBURY, MASSACHUSETTS.

Letters Patent No. 73,180, dated January 7, 1868.

IMPROVEMENT IN STRAW-CUTTERS.

The Schedule referred to in these Letters Patent and making part of the same.

TO ALL WHOM IT MAY CONCERN:

Be it known that I, J. F. HAMMOND, of North Sudbury, in the county of Middlesex, and State of Massachusetts, have invented a new and improved Self-Feeding Double-Action Bevelled-Knife Hay-Cutter; and I do hereby declare that the following is a full, clear, and exact description thereof, which will enable others skilled in the art to make and use the same, reference being had to the accompanying drawings, forming part of this specification.

Figure 4 is a vertical cross-section of the same, taken through the line $y$ $y$, fig. 1.

Similar letters of reference indicate corresponding parts.

My invention has for its object to furnish an improved hay-cutter, which shall be self-feeding and double-acting, and which will do its work quicker and better than the hay-cutters now in general use; and it consists in the combination and arrangement of the bevelled knives with the sliding frame and feed-box, and in the combination of the slotted arms or levers, sliding frame, and sliding rake-head, with each other and with the feed-box and sliding knife-frame; the whole being constructed and arranged as hereinafter more fully described.

Figure 1:
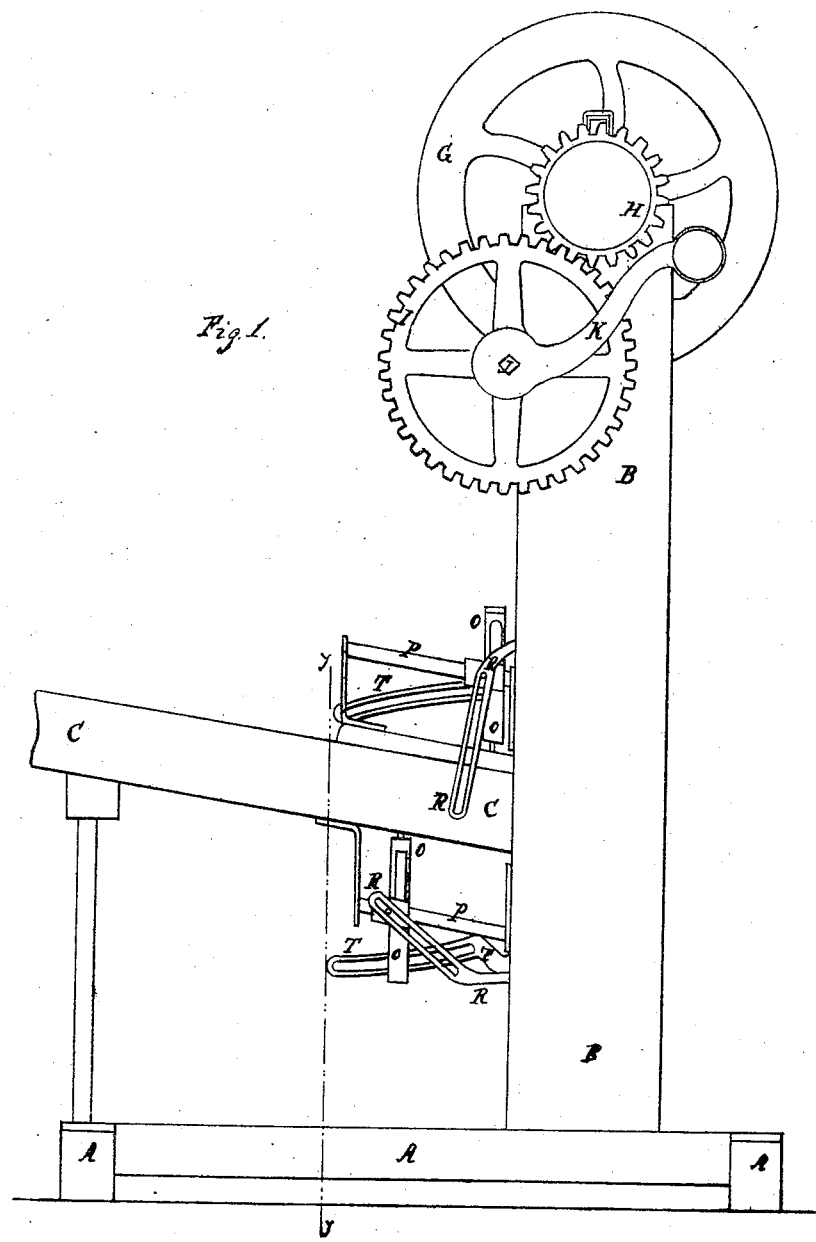
Figure 1 is a side view of my improved machine.
Figure 2:
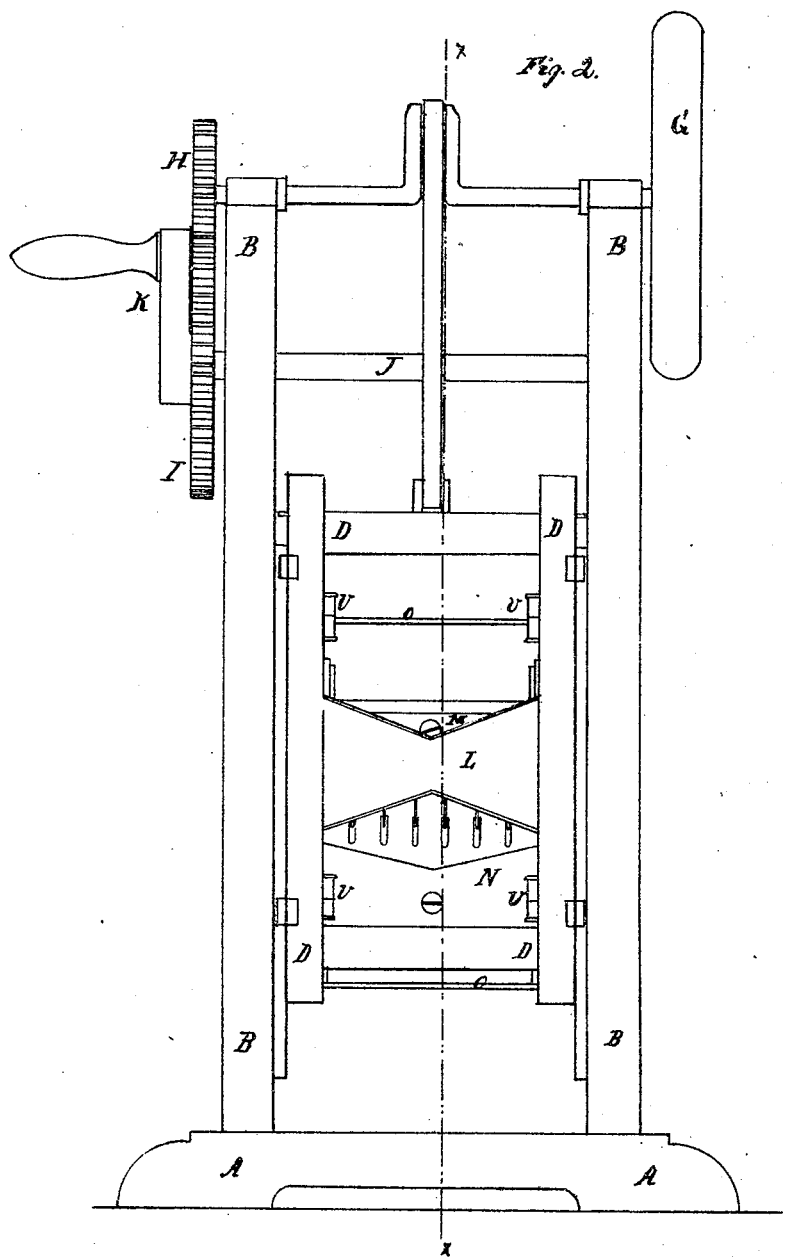
Figure 2 is front view of the same.
Figure 3:
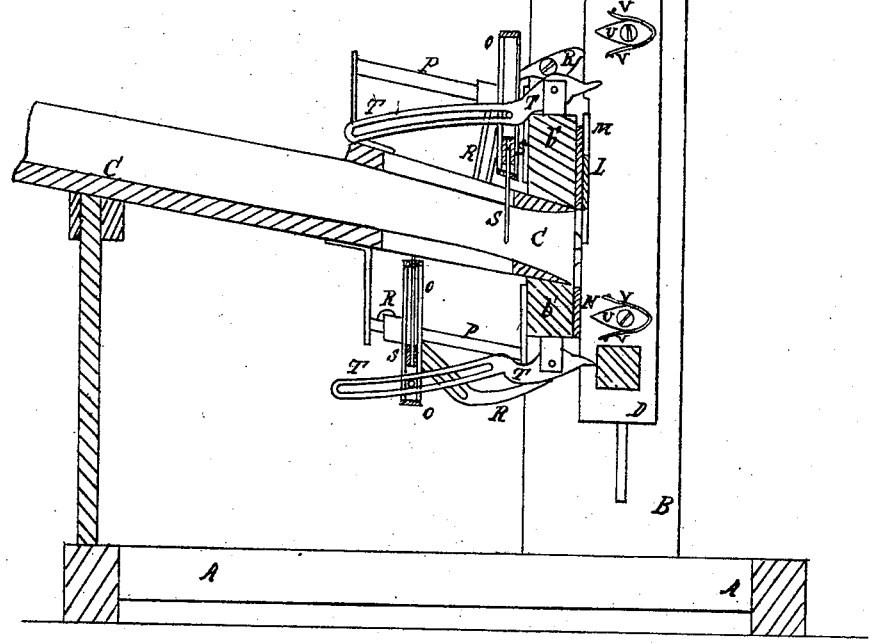
Figure 3 is a vertical longitudinal section of the same, taken through the line $x$ $x$, fig. 2.

A is the foundation-frame of the machine. B is a vertical frame, to which the forward end of the feed-box C is attached, and within which the knife-frame D slides up and down. To the centre of the upper end of the sliding knife-frame D is pivoted the lower end of the connecting-rod E, the upper end of which is pivoted to the crank formed upon the shaft F, which revolves in bearings in the upper end of the frame B. To one end of the shaft F is attached a fly-wheel, G, and to its other end a small bevel-gear wheel, H, the teeth of which mesh into the teeth of the larger gear-wheel I attached to the shaft J. The shaft J revolves in bearings attached to the frame B, and to its end, or to the gear-wheel I, is attached the crank K, by which the machine is operated. L is a knife attached to the rear side of the central part of the frame D, and both the upper and lower edges of which are bevelled, as shown in fig. 2, and have cutting-edges formed upon them. M and N are knives attached to the forward end or mouth of the feed-box C or to the vertical frame B. The lower edge of the knife M and the upper edge of the knife N are bevelled to correspond with the knife L, so that a cut may be made upon the upward as well as upon the downward movement of the knife-frame D. O are vertical frames sliding upon the guide-rods P, secured to supports attached to the top and bottom of the forward part of the feed-box C, as shown in figs. 1, 3, and 4. To the ends of the frames O are attached pins, which enter slots in the arms R, by which the said frames are moved back and forth. The slotted lever-arms R are pivoted to the inner sides of the frame B, and their ends project forward, so as to be struck and operated at the proper time to move the said frames O, by stop-pins attached to the sliding knife-frame D. S are rake-heads, sliding vertically in grooves in the sliding frames O, the teeth of which pass through and work in slots in the top and bottom of the feed-box C. To the inner sides of the vertical arms of the rake-heads S are attached pins, which enter slots in the levers or arms T, by means of which the rake-heads are withdrawn from or forced forward into the feed-box C. The lever-arms T are pivoted to supports attached to the cross-bars $b$ of the frame B, and their ends project forward, so as to be struck and operated to raise and lower the rake-heads at the proper time by the catches or stops U pivoted to the sliding knife-frame D. V are springs passing around the forward ends of the catches U, with their free ends resting against pins, as shown in fig. 3, said pins also limiting the movement of the said stops or catches. This construction of the stops U V enables them to hold the rake-heads S out of the feed-box C while being moved back to again feed the hay or straw forward to the knives. The rake-heads S, vertical frames O, lever-arms R and T, stop and spring-stops or catches U V, are so arranged that the one rake-head is withdrawn from the feed-box and moved back, while the other is thrust into the said feed-box and is feeding the hay or straw forward to the knives.

I claim as new, and desire to secure by Letters Patent—

1. The combination and arrangement of the bevelled knives L, M, N, with each other and with the sliding frame D and feed-box C, substantially as herein shown and described, and for the purpose set forth.

2. The combinations of the slotted lever-arms R T, sliding frames O, and sliding rake-heads S, one set or both, with each other, with the feed-box C, frame B, and knife-frame D, substantially as herein shown and described, and for the purpose set forth.

J. F. HAMMOND.

Witnesses:
GEO. W. BARTON,
GEO. H. RICE.